United States Patent
Sahlsten

(10) Patent No.: US 10,488,665 B2
(45) Date of Patent: Nov. 26, 2019

(54) DISPLAY APPARATUS AND METHOD OF DISPLAYING USING MEANS FOR PROVIDING VISUAL CUES

(71) Applicant: Varjo Technologies Oy, Helsinki (FI)

(72) Inventor: Oiva Arvo Oskari Sahlsten, Salo (FI)

(73) Assignee: VARJO TECHNOLOGIES, Helsinki (FI)

(*) Notice: Subject to any disclaimer, the term of this patent is extended or adjusted under 35 U.S.C. 154(b) by 36 days.

(21) Appl. No.: 15/790,234

(22) Filed: Oct. 23, 2017

(65) Prior Publication Data
US 2019/0122618 A1 Apr. 25, 2019

(51) Int. Cl.
*G02B 27/01* (2006.01)

(52) U.S. Cl.
CPC ....... *G02B 27/0172* (2013.01); *G02B 27/017* (2013.01); *G09G 2310/0232* (2013.01)

(58) Field of Classification Search
CPC ...... G02B 27/01; G02B 27/14; G02B 27/017; G02B 27/0172; G09G 5/00; G09G 2310/0232
See application file for complete search history.

(56) References Cited

U.S. PATENT DOCUMENTS

| | | | |
|---|---|---|---|
| 5,585,813 A | 12/1996 | Howard | |
| 7,928,927 B1* | 4/2011 | Krenz | G02B 27/017 345/633 |
| 9,454,010 B1* | 9/2016 | Passmore | G02B 3/0087 |
| 9,606,362 B2* | 3/2017 | Passmore | G06T 15/50 |
| 9,961,332 B2* | 5/2018 | Passmore | G02B 27/0172 |
| 2008/0088936 A1* | 4/2008 | Tang | G02B 27/0172 359/630 |
| 2015/0302660 A1 | 10/2015 | O'Connor et al. | |
| 2017/0160546 A1* | 6/2017 | Bull | G02B 27/0172 |

FOREIGN PATENT DOCUMENTS

| | | |
|---|---|---|
| EP | 1379082 A1 | 1/2004 |
| EP | 3112985 A1 | 1/2017 |

OTHER PUBLICATIONS

International Preliminary Report on Patentability and Written Opinion received for International Patent Application No. PCT/FI2018/050769, dated Jan. 24, 2019, 14 pages.

\* cited by examiner

*Primary Examiner* — Gene W Lee
(74) *Attorney, Agent, or Firm* — Ziegler IP Law Group, LLC

(57) ABSTRACT

A display apparatus and method of displaying, via the display apparatus. The display apparatus includes at least one image renderer for rendering an image; an exit optical element through which a projection of the rendered image exits the display apparatus to be incident upon a user's eye, when the display apparatus is head-mounted by the user; means for providing visual cues, the visual cues being provided in a peripheral region, the peripheral region substantially surrounding a viewport of the exit optical element; and a processor coupled to the at least one image renderer and the means for providing the visual cues, wherein the processor generates a drive signal based at least partially upon a region of the rendered image that is not visible in the viewport of the exit optical element, and to control, via the drive signal, the means for providing the visual cues.

15 Claims, 4 Drawing Sheets

DISPLAY APPARATUS AND METHOD OF DISPLAYING USING MEANS FOR PROVIDING VISUAL CUES

TECHNICAL FIELD

The present disclosure relates generally to virtual and augmented reality; and more specifically, to display apparatuses comprising image renderers, exit optical elements, means for providing visual cues and processors. Furthermore, the present disclosure also relates to methods of displaying, via the aforementioned display apparatuses.

BACKGROUND

In recent times, there has been rapid advancement in development and use of technologies such as virtual reality, augmented reality, and so forth, for presenting a simulated environment to a user. Specifically, such technologies provide the user with a feeling of complete involvement in the simulated environment by employing contemporary techniques such as stereoscopy. Therefore, such simulated environments enhance the user's perception of reality around him/her. Moreover, such simulated environments relate to fully virtual environments (namely, virtual reality environments) as well as real world environments including virtual objects overlaid thereon (namely, augmented reality environments).

Typically, for experiencing such a simulated environment, the user may use a device, for example, such as a virtual reality device, an augmented reality device, and the like. Generally, the virtual and augmented reality devices are binocular devices having dedicated display optics for each eye of the user. Examples of the virtual reality devices include head mounted virtual reality devices, virtual reality glasses, and so forth. Furthermore, examples of the augmented reality devices include augmented reality headsets, augmented reality glasses, and so forth.

However, conventional virtual and augmented reality devices have certain limitations associated therewith. Firstly, an image rendering equipment of the virtual and/or augmented reality devices often have comparatively smaller visual width than the field of view of the user's eye. Consequently, images displayed by the image rendering equipment appear to be discontinuous around edges of the image rendering equipment. Therefore, the user may see boundaries (namely, black edges) around a visual scene of a simulated environment created by employing such discontinuous images. Furthermore, such boundaries severely diminish a quality of the user's experience of the simulated environment due to sub-optimal immersiveness. Secondly, the user often has no perception of visual scenes of the simulated environment that extend beyond the visual width of (namely, lie beyond a viewport of) the image rendering equipment of the virtual and/or augmented reality devices. This severely limits the user's reaction to such visual scenes that extend beyond the visual width of such image rendering equipment.

Therefore, in light of the foregoing discussion, there exists a need to overcome the aforementioned drawbacks associated with conventional virtual and augmented reality devices.

SUMMARY

The present disclosure seeks to provide a display apparatus. The present disclosure also seeks to provide a method of displaying, via such a display apparatus. The present disclosure seeks to provide a solution to the existing problem of discontinuity around edges of images displayed by conventional virtual and augmented reality devices images leading to sub-optimal immersive experience of a simulated environment to a user. An aim of the present disclosure is to provide a solution that overcomes at least partially the problems encountered in the prior art, and provides a robust, reliable and efficient display apparatus that eliminates aforesaid problems in the existing display apparatuses.

In one aspect, an embodiment of the present disclosure provides a display apparatus comprising:

at least one image renderer for rendering an image;

an exit optical element through which a projection of the rendered image exits the display apparatus to be incident upon a user's eye, when the display apparatus is head-mounted by the user;

means for providing visual cues, the visual cues being provided in a peripheral region, the peripheral region substantially surrounding a viewport of the exit optical element, whilst lying within a field of view of the user; and a processor coupled to the at least one image renderer and the means for providing the visual cues, wherein the processor is configured to generate a drive signal based at least partially upon a region of the rendered image that is not visible in the viewport of the exit optical element, and to control, via the drive signal, the means for providing the visual cues.

In another aspect, an embodiment of the present disclosure provides a method of displaying, via a display apparatus comprising at least one image renderer, an exit optical element and means for providing visual cues, the method comprising:

rendering an image at the at least one image renderer, wherein a projection of the rendered image exits the display apparatus through the exit optical element to be incident upon a user's eye, when the display apparatus is head-mounted by the user;

generating a drive signal based at least partially upon a region of the rendered image that is not visible in a viewport of the exit optical element; and controlling, via the drive signal, the means for providing the visual cues to provide the visual cues in a peripheral region, the peripheral region substantially surrounding the viewport of the exit optical element, whilst lying within a field of view of the user.

Embodiments of the present disclosure substantially eliminate or at least partially address the aforementioned problems in the prior art, and facilitates continuity around edges of images and creation of visual cues to indicate the user about visual scenes that lies in the peripheral region, whilst lying within a field of view of the user.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
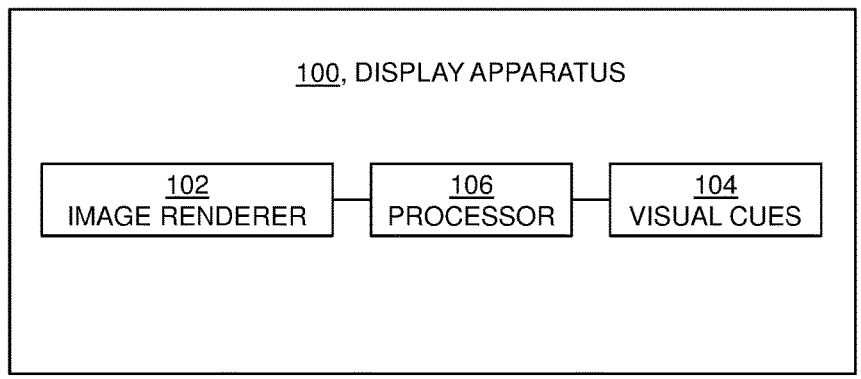
FIG. 1 is a block diagram of architecture of a display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display apparatus comprising:
at least one image renderer for rendering an image;
an exit optical element through which a projection of the rendered image exits the display apparatus to be incident upon a user's eye, when the display apparatus is head-mounted by the user;
means for providing visual cues, the visual cues being provided in a peripheral region, the peripheral region substantially surrounding a viewport of the exit optical element, whilst lying within a field of view of the user; and
a processor coupled to the at least one image renderer and the means for providing the visual cues, wherein the processor is configured to generate a drive signal based at least partially upon a region of the rendered image that is not visible in the viewport of the exit optical element, and to control, via the drive signal, the means for providing the visual cues.

In another aspect, an embodiment of the present disclosure provides a method of displaying, via a display apparatus comprising at least one image renderer, an exit optical element and means for providing visual cues, the method comprising:
rendering an image at the at least one image renderer, wherein a projection of the rendered image exits the display apparatus through the exit optical element to be incident upon a user's eye, when the display apparatus is head-mounted by the user;
generating a drive signal based at least partially upon a region of the rendered image that is not visible in a viewport of the exit optical element; and
controlling, via the drive signal, the means for providing the visual cues to provide the visual cues in a peripheral region, the peripheral region substantially surrounding the viewport of the exit optical element, whilst lying within a field of view of the user.

The present disclosure provides the aforementioned display apparatus and the aforementioned method of displaying, via such a display apparatus. The display apparatus described herein allows for elimination of discontinuities around the edges of images displayed by the display apparatus. Furthermore, the display apparatus enables the user to see improved contrast and colour of the images. Therefore, the display apparatus facilitates an enhanced immersive experience of a simulated environment for the user of the display apparatus. Furthermore, the display apparatus described herein allows for the user to perceive visual scenes that extend (namely, occur) beyond visual width of the exit optical element of the display apparatus.

Throughout the present disclosure, the term "display apparatus" used herein relates to specialized equipment that is configured to display (namely, present) the image to the user of the display apparatus. In such an instance, the display apparatus is operable to act as a device (for example, such as a virtual reality headset, an augmented reality headset, a pair of virtual reality glasses, a pair of augmented reality glasses, and so forth) for displaying the image to the user.

As mentioned previously, the at least one image renderer renders the image. Specifically, the rendered image is projected onto the user's eye when the display apparatus is head-mounted by the user. According to an embodiment, the term "image" used herein relates to a representation of a virtual scene of a simulated environment (for example, such as a virtual reality environment) to be displayed via the display apparatus.

According to another embodiment, the term "image" used herein relates to an image of at least one virtual object. Examples of the at least one virtual object include, but are not limited to, a virtual navigation tool, a virtual gadget, a virtual message, a virtual entity, and a virtual media. Furthermore, in such an embodiment, the image may be overlaid on a projection of a real world image to constitute a visual scene of a resultant simulated environment (for example, such as an augmented reality environment). Throughout the present disclosure, the term "real world image" used herein relates to an image depicting actual surroundings of the user whereat he/she is positioned. Optionally, the display apparatus comprises at least one camera to capture the real world image. More optionally, the display apparatus further comprises at least one optical equipment to implement aforesaid overlaying operation and to project the resultant simulated environment onto the eye of the user of the display apparatus (for example, such as, an augmented reality headset, a pair of augmented reality glasses, and the like).

According to yet another embodiment, the term "image" used herein relates to a pictorial representation (namely, a visual perception) of a subject. Examples of the subject include, but are not limited to, an object, a person, a map, a painting, a landscape, a graphical diagram, and text. Optionally, the image is a two-dimensional representation of the subject.

Throughout the present disclosure, the term "at least one image renderer" used herein relates to equipment configured to facilitate rendering of the image. Optionally, the at least one image renderer comprises at least a context image renderer for rendering a context image and a focus image renderer for rendering a focus image, wherein a projection of the rendered context image and a projection of the rendered focus image together form the projection of the rendered image. In such an instance, the image comprises the context image and the focus image. Therefore, the context image and the focus images are rendered in order to collectively constitute the rendered image at the at least one image renderer. It will be appreciated that the context image relates to a wide image of the virtual scene, the at least one virtual object, or the subject, to be rendered and projected via the at least one context image renderer. Furthermore, the focus image may relate to another image depicting a part (namely, a portion) of the virtual scene, the at least one virtual object, or the subject, to be rendered and projected via the at least one focus image renderer. Moreover, the focus image is dimensionally smaller than the context image.

Optionally, an angular width of the projection of the rendered context image ranges from 40 degrees to 220 degrees, whereas an angular width of the projection of the rendered focus image ranges from 5 degrees to 60 degrees. In such an instance, the angular width of the projection of the rendered context image may be, for example, from 40, 50, 60, 70, 80, 90, 100, 110, 120, 130, 140, 150, 160 or 170 degrees up to 70, 80, 90, 100, 110, 120, 130, 140, 150, 160, 170, 180, 190, 200, 210 or 220 degrees, whereas the angular width of the projection of the rendered focus image may be, for example, from 5, 10, 15, 20, 25, 30, 35, 40, 45 or 50 degrees up to 15, 20, 25, 30, 35, 40, 45, 50, 55 or 60 degrees.

Throughout the present disclosure, the term "angular width" refers to an angular width of a given projection as seen from the user's eyes, when the display apparatus is worn by the user. It will be appreciated that optionally, the angular width of the projection of the rendered context image is greater than the angular width of the projection of the rendered focus image since the rendered focus image is typically projected on and around the fovea of the user's eyes, whereas the rendered context image is projected upon the retina of the user's eyes.

Throughout the present disclosure, the term "context image renderer" used herein relates to equipment configured to facilitate rendering of the context image. Similarly, the term "focus image renderer" used herein relates to equipment configured to facilitate rendering of the focus image.

In an embodiment, the at least one image renderer is implemented by way of at least one projector and a projection screen associated therewith. Optionally, a single projection screen may be shared between the at least one projector employed to implement the at least one image renderer. In another embodiment, the at least one image renderer is implemented by way of at least one display configured to emit the projection of the rendered image therefrom.

As mentioned previously, optionally, the at least one image renderer comprises the context image renderer for rendering the context image and the focus image renderer for rendering the focus image. Therefore, in an embodiment, the context image renderer and/or the focus image renderer are implemented by way of the aforesaid at least one projector and the aforesaid projection screen associated therewith. Optionally, the aforesaid single projection screen may be shared between the at least one projector employed to implement the context image renderer and the focus image renderer. In another embodiment, the context image renderer is implemented by way of at least one context display configured to emit the projection of the rendered context image therefrom, and the focus image renderer is implemented by way of at least one focus display configured to emit the projection of the rendered focus image therefrom.

Furthermore, optionally, the display apparatus comprises at least one optical combiner for combining the projection of the rendered context image with the projection of the rendered focus image to create the image.

In an embodiment, the processor is configured to control the at least one image renderer for rendering the image. In another embodiment, an external processor (namely, a processor external to the display apparatus) is configured to control the at least one image renderer for rendering the image. As an example, the external processor may be a processor of a portable electronic device, wherein the portable electronic device is communicably coupled to the display apparatus.

As mentioned previously, the projection of the rendered image exits the display apparatus through the exit optical element, to be incident upon the user's eye, when the display apparatus is head-mounted by the user. Throughout the present disclosure, the term "exit optical element" relates to an optical device configured to direct the projection of the rendered image towards the user's eye, when the display apparatus is head-mounted by the user. Optionally, the exit optical element is configured to direct the projection of the rendered context image and the projection of the rendered focus image, towards the user's eye, when the display apparatus is head mounted by the user.

Optionally, the exit optical element magnifies a size (or angular dimensions) of the projection of the rendered image. In such a case, use of a magnifying optical element allows for use of dimensionally small components (namely, dimensionally small at least one image renderer) within the display apparatus. Furthermore, optionally, the exit optical element is implemented by way of at least one of: a convex lens, a plano-convex lens, a Liquid Crystal (LC) lens, a liquid lens, a Fresnel lens, an aspherical lens, an achromatic lens.

Optionally, the exit optical element has a curved surface facing the user's eye. In such an instance, the curved surface may be convex (namely, bulging towards the user's eye) or concave (namely, bulging inwards, away from the user's eye).

As mentioned previously, the means for providing visual cues provide the visual cues in the peripheral region. The peripheral region substantially surrounds the viewport of the exit optical element, whilst lying within the field of view of the user. Throughout the present disclosure, the term "peripheral region" relates to a region within the field of view of the user, which substantially lies between a boundary of the field of view of the user and the viewport of the exit optical element, when the display apparatus is head mounted by the user. It will be appreciated that the peripheral region is obtained by subtracting the region of viewport of the exit optical element from the field of view of the user's eye, when the display apparatus is head-mounted by the user.

Furthermore, throughout the present disclosure, the term "visual cues" relates to visual indications (namely, indications in form of light) to be provided to the user's eye, via the display apparatus. It will be appreciated that since the visual cues enhance immersion (namely, visual perception) of the user within the rendered image. Beneficially, as an example, the visual cues allow for the user of the display apparatus to perceive visual scenes that are not visible in the viewport (namely, visual width) of the exit optical element of the display apparatus. Furthermore, beneficially, as another example, the visual cues allow for providing an indication about at least one subsequent image, to be rendered by the at least one image renderer, after the rendered image. Furthermore, as mentioned previously, the visual cues are to be provided in the surroundings of the viewport of the exit optical element (namely, in the peripheral region) such that the visual cues lie within the field of view of the user.

Throughout the present disclosure, the term "means for providing visual cues" relates to equipment configured to provide the visual cues to the user. Optionally, the means for providing visual cues provides indications in the form of light to the user of the display apparatus.

As mentioned previously, the processor is coupled to the at least one image renderer and the means for providing the visual cues. The processor is configured to generate the drive signal based at least partially upon the region of the rendered image that is not visible in the viewport of the exit optical element. It will be appreciated that the drive signal is based at least partially upon the region of the rendered image that is not visible in the viewport of the exit optical element, to allow the user to perceive such a region, even without directly viewing it.

In an embodiment, the processor is implemented by way of hardware, software, firmware or a combination of these, suitable for controlling the operation of the display apparatus.

Throughout the present disclosure, the term "drive signal" used herein relates to an operative signal used to control operation of the means for providing visual cues. As mentioned previously, the drive signal is based at least partially upon the region of the rendered image that is not visible in the viewport of the exit optical element. Optionally, the drive signal is based at least partially upon at least one of: properties of the rendered image that is visible in the viewport of the exit optical element, properties of the at least one subsequent image that is to be rendered at the at least one image renderer after the rendered image, preference of the user, ambient light in the actual surroundings of the user. Examples of the properties of the rendered image and/or the at least one subsequent image include, but are not limited to, brightness, contrast, color, ambient light, and shadows within the rendered image and/or the at least one subsequent image.

The processor is configured to control, via the drive signal, the means for providing the visual cues. It will be appreciated that such control of the means for providing the visual cues allows for the processor to control, for example, a number of the visual cues to be provided, time duration of provision of the visual cues, a region of the provision of the visual cues, visual attributes of the visual cues, and so forth. Examples of visual attributes of the visual cues include, but are not limited to, colors of the visual cues, brightness of the visual cues, sharpness of the visual cues, and dimensions of the visual cues.

As an example, a rendered image I depicts a virtual scene of a house and a park adjoining the house. In such an example, a region R1 of the image I depicting the house may be visible in the viewport of the exit optical element whereas another region R2 of the image I depicting the park may not be visible in the viewport of the exit optical element. In such a case, the region R2 of the rendered image I may have different properties (for example, the region R2 depicting the park may be brighter) as compared to the region R1 of the image I. In such an instance, the processor may generate a drive signal D1, based at least partially upon the region R2, to allow for providing an indication of the park even though the park is not visible in the viewport of the exit optical element. Therefore, the processor may control, via the generated drive signal D1, the means for providing visual cues to illuminate the peripheral region with white light (namely, to indicate presence of natural ambient light in the park).

As another example, a simulated environment of a horror game may be presented via the display apparatus. In such an instance, a rendered image A may depict a visual scene of a ruined castle environment. It is to be understood that a region RR of the rendered image depicting a room within the ruined castle may be visible in the viewport of the exit optical element whereas a region RL of the rendered image A depicting a library within the ruined castle may not be visible in the viewport of the exit optical element. In such an instance, the user of the display apparatus may prefer that the visual cues to be provided in the peripheral region are dark in color and have low brightness. Therefore, the processor may generate the drive signal based upon the region RL of the rendered image A that is not visible in the viewport of the exit optical element, and the preference of the user.

Optionally, the processor is configured to generate the drive signal based upon the at least one subsequent image that is to be rendered at the at least one image renderer after the rendered image. In such a case, the processor may receive the at least one subsequent image to be rendered by the display apparatus, and may determine the properties of the at least one subsequent image. Thereafter, the processor may generate the drive signal based upon the properties of the at least one subsequent image. For example, if a rendered image X1 depicts a visual scene having low brightness and a subsequent image X2 (to be rendered at the at least one image renderer after the rendered image X1) has high brightness, the processor may generate the drive signal based upon the subsequent image X2 (namely, upon properties of the subsequent image X2).

Optionally, the means for providing the visual cues comprises a plurality of light emitting elements that are arranged in the peripheral region, and wherein the processor is configured to control a color and/or intensity of light emitted by the plurality of light emitting elements. In such an instance, the plurality of light emitting elements are employed to emit light for illuminating the peripheral region when the display apparatus is worn by the user. Furthermore, the plurality of light emitting elements are arranged in the peripheral region substantially surrounding the viewport of the exit optical element. Therefore the plurality of light emitting elements lie within the field of view of the user, and the light emitted therefrom is visible to the user. It will be appreciated that the plurality of light emitting elements are operable to illuminate one eye or both eyes of the user.

Throughout the present disclosure, the term "plurality of light emitting elements" used herein relates to at least one light source configured to emit light onto the user's eye to provide the visual cues to the user. Optionally, in this regard, the plurality of light emitting elements are configured to emit light of visible wavelength. The light emitted by the plurality of light emitting elements provides an ambient lighting effect substantially surrounding the viewport of the exit optical element, thereby increasing immersiveness when the rendered image and such light are incident upon the user's eye. Optionally, the plurality of light emitting elements are implemented by way of at least one of: light emitting diodes, light lasers, light projectors and the like.

As mentioned previously, optionally, the color and/or intensity of the light emitted by the plurality of light emitting elements are adjustable. In such an instance, optionally, the color and/or intensity of the emitted light may be adjustable via adjustment of the drive signal. It will be appreciated that the aforesaid adjustment of the color and/or intensity of the emitted light allows for controlling visual attributes of the visual cues. As an example, a low amplitude drive signal may control the plurality of light emitting elements to emit light having low intensity, whereas a high amplitude drive signal may control the plurality of light emitting elements to emit light having high intensity. Optionally, the processor is further configured to control other properties of the light (for example, such as wavelength, optical path, and so forth) emitted by the plurality of light emitting elements.

In an embodiment, the processor is configured to control, via the drive signal, the color of the light emitted by the plurality of light emitting elements. In another embodiment, the processor is configured to control, via the drive signal, the intensity of the light emitted by the plurality of light emitting elements. In yet another embodiment, the processor is configured to control, via the drive signal, the color and intensity of the light emitted by the plurality of light emitting elements.

For illustration purposes only, there will now be considered an example, wherein the display apparatus renders an image Y. The rendered image Y may depict a visual scene of an inside environment of a house. In such an example, a region Y1 of the image Y depicting a dimly-lit storage-room within the house may be visible in the viewport of the exit optical element whereas another region Y2 of the image Y depicting a sunlight-illuminated living room of the house, that is adjacent to the storage-room, may not be visible in the viewport of the exit optical element. In such a case, the region Y2 of the rendered image Y may have different properties (for example, the region Y2 depicting the living room is brightly illuminated) as compared to the region Y1 of the image Y. In such an instance, the processor may generate a drive signal S, based at least partially upon the region Y2, to allow for providing an indication of the bright sunlight illuminating the living room even though the living room is not visible in the viewport of the exit optical element. Therefore, the processor may control, via the generated drive signal S, a color of the light emitted by the plurality of light emitting elements to illuminate the peripheral region with yellow light (namely, to indicate presence of the sunlight illuminating the living room). Furthermore, the processor may also control, via the generated drive signal S, an intensity of the yellow light emitted by the plurality of light emitting elements. In this case, the plurality of light emitting elements provides high intensity of light in the peripheral region.

Optionally, a distance between the plurality of light emitting elements and the user's eye is substantially similar to a distance between the exit optical element and the user's eye, when the display apparatus is head-mounted by the user. In such a case, the plurality of light emitting elements are optionally arranged in a manner that a shape/physical structure of the plurality of light emitting elements remains out of focus of the user's eye. Therefore, the user is unable to view the plurality of light emitting elements, but is able to view the light emitted therefrom. Beneficially, in such an instance, owing to low spatial resolution of the peripheral region with regard to the user's eye, the light emitted by the plurality of light emitting elements appears uniform even when the plurality of light emitting elements are positioned spatially apart from each other.

Furthermore, optionally, the means for providing the visual cues further comprises a plurality of diffusers for diffusing the light emitted by the plurality of light emitting elements. The plurality of diffusers are coupled to the plurality of light emitting elements in a manner that the light emitted by the plurality of light emitting elements is scattered or spread to provide a soft light effect. In operation, the plurality of diffusers are placed in an optical path of the light emitted by the plurality of light emitting elements. The plurality of diffusers distribute such emitted light gradually (namely, subtly) within the peripheral region.

Throughout the present disclosure, the term "plurality of diffusers" relates to optical components used to evenly or unevenly distribute the light emitted by the plurality of light emitting elements so as to eliminate distinct bright and/or dark spots. Optionally, the plurality of diffusers are implemented by way of at least two of: a ground glass diffuser, a teflon diffuser, a holographic diffuser, a opal glass diffuser, and a greyed glass diffuser.

Additionally, optionally, the plurality of light emitting elements comprise at least a first set of light emitting elements and a second set of light emitting elements, wherein a color and/or intensity of light emitted by the first set of light emitting elements is different from a color and/or intensity of light emitted by the second set of light emitting elements. In such an instance, the processor optionally generates separate drive signals to control the first and second sets of light emitting elements. Furthermore, optionally, the first and second sets of light emitting elements are arranged within the peripheral region, in a manner that the first and second sets of light emitting elements are spatially apart from each other. Alternatively, optionally, the first and second sets of light emitting elements are interspersed throughout the peripheral region. In such an instance, the first and second sets of light emitting elements may or may not be uniformly interspersed within the peripheral region.

In an example, when the display apparatus is head-mounted by the user, the first set of light emitting elements may be arranged on a left side of the viewport of the exit optical element, in the peripheral region, whereas the second set of light emitting elements may be arranged on a right side of the viewport of the exit optical element, in the peripheral region. In another example, the first set of light emitting elements may be arranged on a top side of the viewport of the exit optical element, in the peripheral region, whereas the second set of light emitting elements may be arranged on a bottom side of the viewport of the exit optical element, in the peripheral region. In yet another example, the first set of light emitting elements and the second set of light emitting elements may be randomly interspersed within the peripheral region.

As mentioned previously, optionally, the first set of light emitting elements and the second set of light emitting elements are configured to emit the light having different color and/or intensity. For illustration purposes only, there will now be considered an example, wherein, the display apparatus may render an image Z of a visual scene at the at least one image renderer, wherein the image Z depicts two objects OB1 and OB2. Furthermore, in such an instance, a region Z1 of the image Z that depicts the object OB1 may be visible in the viewport of the exit optical element whereas a region Z2 of the image Z that depicts the object OB2 may not be visible in the viewport of the exit optical element. For example, the image Z may include a left part substantially corresponding to the region Z1 and a right part substantially corresponding to the region Z2, in a manner that the region Z2 may become visible in the viewport of the exit optical element if the user viewing the region Z1 turns his/her head rightwards. Therefore, in such an instance, the region Z2 appears to enter the visual scene from a right side of the viewport of the exit optical element. Furthermore, in such an example, the first set of light emitting elements may be arranged on a left side of the aforesaid viewport whereas the second set of light emitting elements may be arranged on the right side of the aforesaid viewport. Therefore, optionally, based on attributes of the objects OB1 and OB2, the processor may generate different drive signals for the first and second sets of light emitting elements in a manner that a color of light emitted by the first set of light emitting elements is substantially similar to a color of the object OB1 whereas a color of light emitted by the second set of light emitting elements is substantially similar to a color of the object OB2. It will be appreciated that such an implementation allows for provision of a visual indication pertaining to the object OB2 even when the object OB2 is not visible in the viewport of the exit optical element.

Optionally, the display apparatus further comprises a motion detector. The motion detector is configured to detect the movement of the user's head, when the display apparatus is head mounted by the user. More optionally, the motion detector is at least one of an accelerometer, a gyroscope motion sensor and the like. Optionally, in this regard, the processor is communicably coupled to the motion detector and the means for providing visual cues, wherein the processor is configured to receive the detected movement of the users' head from the motion detector, and to control, via the drive signal, the means for providing visual cues based upon the detected movement of the user's head.

As an example, the display apparatus may render an image M of a visual scene at the at least one image renderer, wherein the image M depicts two objects O1 and O2. In such an example, the first set of light emitting elements may be arranged on a left side of the viewport of the exit optical element whereas the second set of light emitting elements may be arranged on the right side of the viewport. Furthermore, in such an instance, a region M1 of the image M that depicts the object O1 may be visible in the viewport of the exit optical element whereas a region M2 of the image M that depicts the object O2 may not be visible in the viewport of the exit optical element. However, the object O2 may become visible in the viewport of the exit optical element if the user viewing the region M1, turns his/her head rightwards. In such an example, if the object O2 present in the region M2 depicts fireworks, the processor may control, via a drive signal, the second set of light emitting elements based on attributes of the object O2 present in the region M2. For example, the processor may control, via the drive signal, a color of the light emitted by the second set of light emitting elements to emit yellow light (namely, to indicate presence of firework). Optionally, the processor may control the second set of light emitting elements to blink periodically, to provide the user a visual cue to turn his/her head rightwards. Furthermore, the motion detector of the display apparatus may detect such a rightward movement of the user's head and may transmit a signal, indicating the detected movement of the user's head, to the processor. If the movement of the user's head is such that the object O2 of the region M2 is now visible in the viewport of the exit optical element, the processor may control the means for providing the visual cues, via a drive signal DS1, to stop or change emission of light by the second set of light emitting elements. Optionally, if the movement of the user's head is away from a desired direction (namely, is leftwards, upwards, or downwards), the processor may continue to transmit a drive signal DS2 to allow for emission of the light from the second set of light emitting elements.

Furthermore, optionally, the means for providing the visual cues comprises at least one optical element for guiding light emitted from at least a portion of a rendering border of the at least one image renderer towards the peripheral region, thereby illuminating the peripheral region. Optionally, in this regard, the at least one optical element is arranged along the rendering border of the at least one image renderer.

Throughout the present disclosure, the term "rendering border of the at least one image renderer" relates to a region of the at least one image renderer that lies substantially along edges of the rendered image. In an embodiment, the term "rendering border of the at least one image renderer" relates to a region of the projection screen employed to implement the at least one image renderer that lies substantially along edges of the image rendered at such a projection screen. In another embodiment, the term "rendering border of the at least one image renderer" relates to a region of the at least one context display that lies substantially along edges the context image rendered at such at least one context display.

Throughout the present disclosure, the term "at least one optical element" relates to used herein relates to an optical device that is operable to guide (namely, direct) light emitted by the at least one image renderer towards the peripheral region. It will be appreciated that light emitted by the at least one image renderer substantially corresponds to the projection of the rendered image. Therefore, use of the at least one optical element, allows for providing visual cues relating to the rendered image. Beneficially, such visual cues may appear to merge seamlessly with the rendered image, thereby, increasing the user's immersion within the rendered image.

Optionally, the at least one optical element is implemented by way of at least one of: a lens, a fiber optic element. In an embodiment, the at least optical element is implemented by way of the lens (for example, such as a convex lens). In another embodiment, the at least optical element is implemented by way of the fiber optic element. In yet another embodiment, the fiber optic element and the lens are used as the at least one optical element.

As an example, the at least one image renderer may be implemented as a 200×100 pixel rectangular display. In such an example, the display may have 200 pixels in a horizontal direction (namely, lengthwise) and 100 pixels in a vertical direction (namely, breadth-wise). In such a case, the means for providing the visual cues comprises, for example, at least one optical element for guiding light emitted from at least a portion of a rendering border of the rectangular display towards the peripheral region. Therefore, a rendering border of such a rectangular display may comprise 600 pixels (namely 200 pixels each of top and bottom borders of the display and 100 pixels each from left and right borders of the display). In such an instance, one optical element may guide light emitted from 20 pixels of the rendering border towards the user's eye. Thus, 20 optical elements may be utilized for guiding light emitted from both the top and bottom borders of the display, and 10 optical elements may be utilized for guiding light emitted from both the left and right borders of the display.

In an embodiment, the plurality of diffusers are coupled to the at least one optical element in a manner that the light emitted by the at least one optical element is scattered or spread to provide the soft light effect. In operation, the plurality of diffusers are placed at a part of the at least one optical element wherefrom light is emitted to illuminate the peripheral region. The plurality of diffusers distributes such emitted light gradually (namely, subtly) within the peripheral region.

Furthermore, optionally, the display apparatus comprises a means for detecting a gaze direction coupled in communication with the processor, wherein the processor of the display apparatus is configured to:

(a) receive the detected gaze direction of the user from the means for detecting the gaze direction;

(b) receive the image to be displayed to the user of the display apparatus, and use the detected gaze direction of the user to determine a region of visual accuracy of the image;

(c) process the image to generate the context image and the focus image, the context image having a first resolution and the focus image having a second resolution, wherein:
   a region of the context image that substantially corresponds to the region of visual accuracy of the input image is masked,
   the focus image substantially corresponds to the region of visual accuracy of the input image, and
   the second resolution is higher than the first resolution; and (d) render the context image at the context image renderer and the focus image at the focus image renderer substantially simultaneously, whist controlling the at least one optical combiner to combine the projection of the rendered context image with the projection of the rendered focus image in a manner that the projection of the rendered focus image substantially overlaps the projection of the masked region of the rendered context image.

Optionally, the image to be displayed to the user of the display apparatus is received from an imaging device and/or a memory unit communicably coupled to the display apparatus. Furthermore, it is to be understood that the term "region of visual accuracy" used herein relates to a region of the image whereat the detected gaze direction of the user is directed (namely, focused) when the user of the display apparatus views the image. Therefore, the region of visual accuracy is a fixation region within the image.

Furthermore, optionally, the second resolution (of the focus image) is higher than the first resolution (of the context image) since the rendered focus image is typically projected by the display apparatus on and around the fovea of the user's eye, whereas the rendered context image is projected by the display apparatus upon the retina of the user's eye. Such resolution of the focus and context images allow for emulating visual characteristics of the human visual system when the image is viewed by the user of the display apparatus.

Moreover, optionally, the region of visual accuracy of the image is represented within both the rendered context image of low resolution and the rendered focus image of high resolution. Moreover, the rendered focus image having a high resolution may include more information pertaining to the region of visual accuracy of the image, as compared to the rendered context image having a low resolution. Therefore, it will be appreciated that the processor optionally masks the region of the context image that substantially corresponds to the region of visual accuracy of the image in order to avoid optical distortion of the region of visual accuracy of the image, when the projection of the focus image is combined with the projection of the rendered context image.

Therefore, optionally, use of the the means for detecting the gaze direction within the display apparatus allows for implementing active foveation (namely, gaze-contingency) within the display apparatus.

Therefore, such a display apparatus closely emulates visual characteristics of the human visual system.

The present disclosure also relates to the method as described above. Various embodiments and variants disclosed above apply mutatis mutandis to the method.

DETAILED DESCRIPTION OF THE DRAWINGS

Referring to FIG. 1, illustrated is a block diagram of architecture of a display apparatus 100, in accordance with an embodiment of the present disclosure. As shown, the display apparatus 100 comprises at least one image renderer, depicted as an image renderer 102, for rendering an image; an exit optical element (shown in FIGS. 2a, and 2b) through which a projection of the rendered image exits the display apparatus 100 to be incident upon a user's eye, when the display apparatus 100 is head-mounted by the user; means for providing visual cues 104, the visual cues being provided in a peripheral region (shown in FIGS. 2a, and 2b), the peripheral region substantially surrounding a viewport of the exit optical element, whilst lying within a field of view of the user; and a processor 106 coupled to the at least one image renderer 102 and the means for providing the visual cues 104. The processor 106 is configured to generate a drive signal based at least partially upon a region of the rendered image that is not visible in the viewport of the exit optical element, and to control, via the drive signal, the means for providing the visual cues 104. Optionally, the processor 106 is configured to generate the drive signal based upon at least one subsequent image that is to be rendered at the at least one image renderer 102 after the rendered image.

Figure 2A:
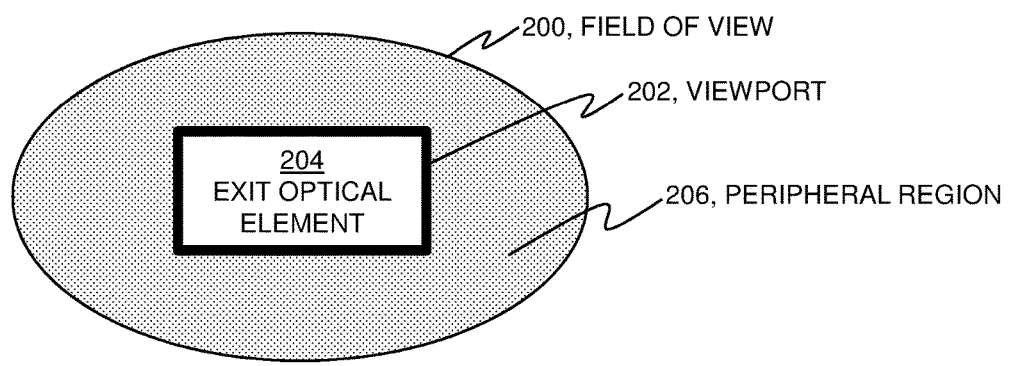
FIG. 2A is an exemplary representation of a field of view of a user's eye when the display apparatus is head-mounted by a user, in accordance with an embodiment of the present disclosure.

Referring to FIG. 2A, illustrated is an exemplary representation of a field of view 200 of a user's eye when a display apparatus (for example, such as the display apparatus 100 of FIG. 1) is head-mounted by the user, in accordance with an embodiment of the present disclosure. As shown, the field of view 200 of the user's eye comprises a viewport 202 of an exit optical element 204 and a peripheral region 206. The peripheral region 206 substantially surrounds the viewport 202 of the exit optical element 204, whilst lying within the field of view 200 of the user.

Figure 2B:
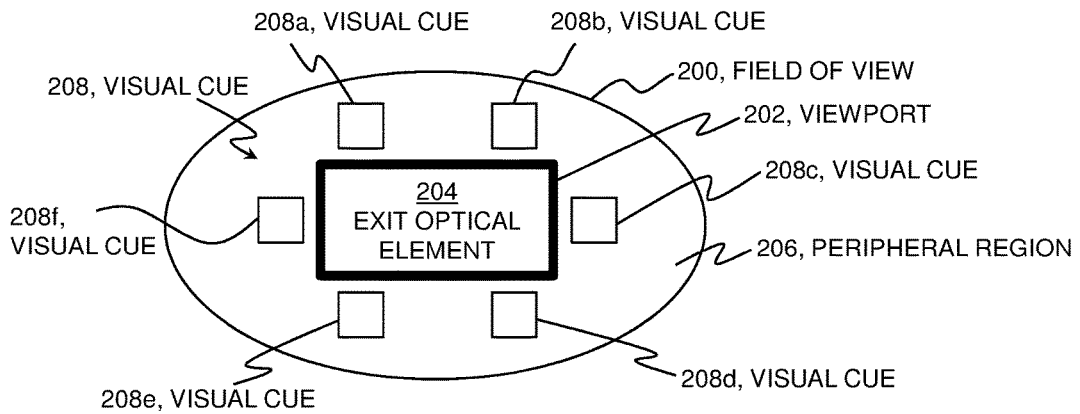
FIG. 2B is an exemplary representation of means for providing visual cues arranged in a peripheral region substantially surrounding a viewport of an exit optical element of FIG. 2A, in accordance with an embodiment of the present disclosure.

Referring to FIG. 2B, illustrated is an exemplary representation of means for providing visual cues 208 arranged in the peripheral region 206 substantially surrounding the viewport 202 of the exit optical element 204 of FIG. 2A, in accordance with an embodiment of the present disclosure. As shown, the means for providing the visual cues 208 optionally comprises a plurality of light emitting elements, depicted as light emitting elements 208a, 208b, 208c, 208d, 208e, and 208f that are arranged in the peripheral region 206.

Figure 3:
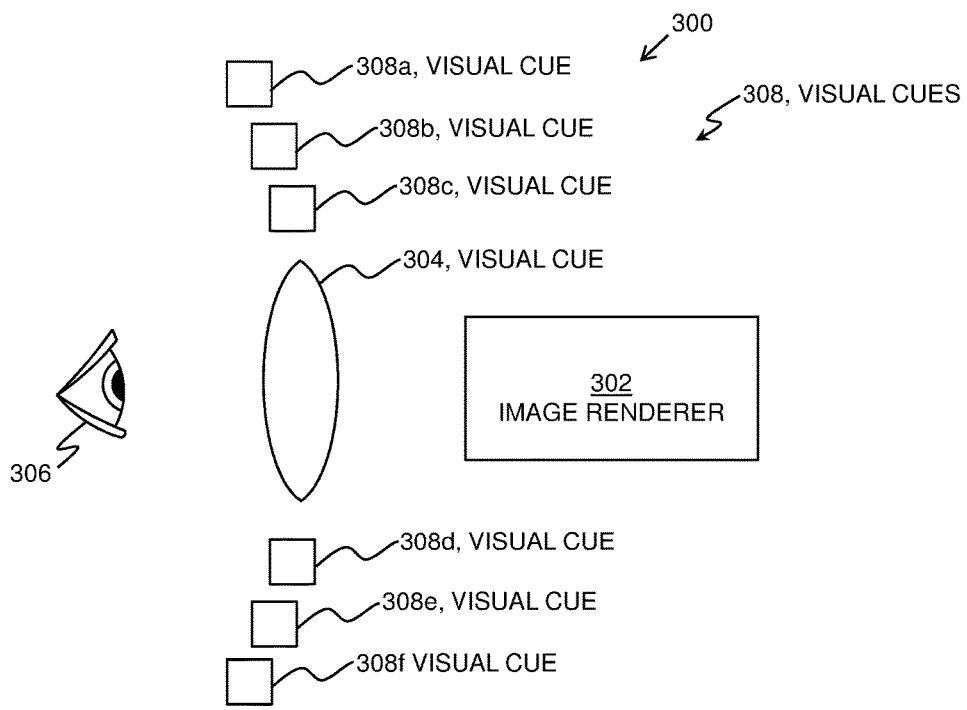
FIG. 3-4 are exemplary implementations of the display apparatus, in accordance with different embodiments of the present disclosure.
Figure 4:
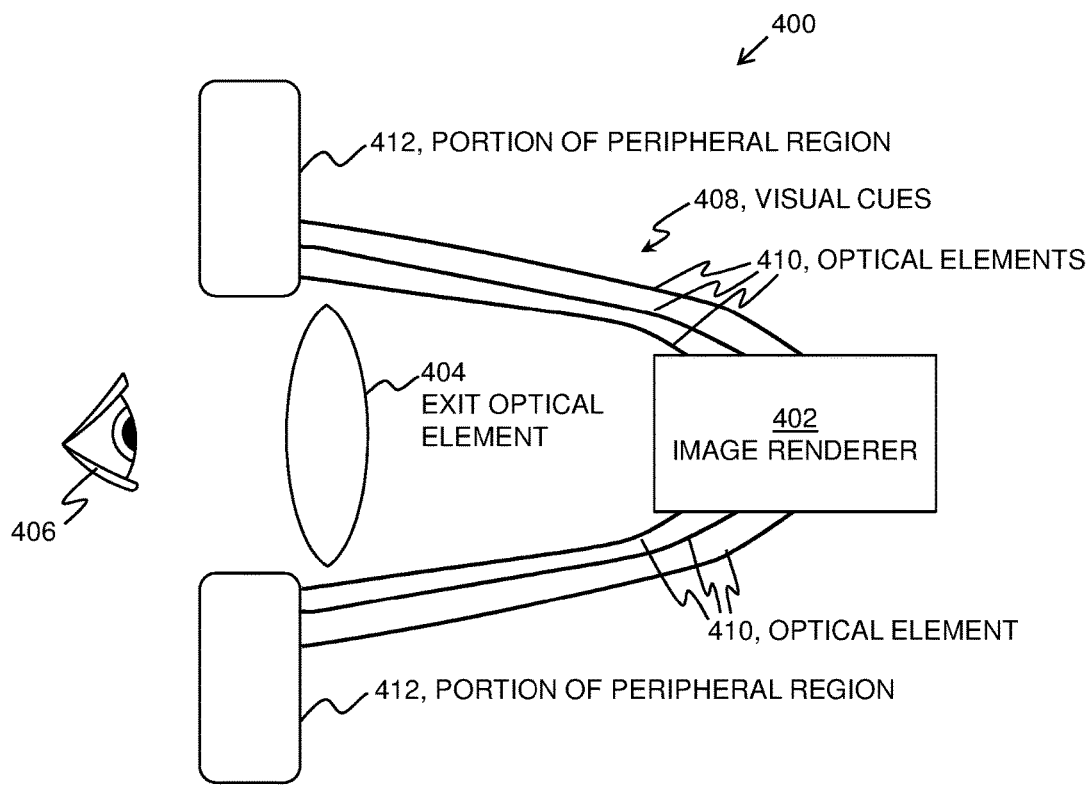

Referring to FIGS. 3 and 4, illustrated are exemplary implementations of the display apparatus 100 (as shown in FIG. 1) in use within a display apparatus (not shown), in accordance with different embodiments of the present disclosure. It may be understood by a person skilled in the art that the FIGS. 3 and 4 include simplified arrangements for implementation of the display apparatus 100 for sake of clarity, which should not unduly limit the scope of the claims herein. The person skilled in the art will recognize many variations, alternatives, and modifications of embodiments of the present disclosure.

Referring to FIG. 3, illustrated is an exemplary implementation of a display apparatus 300 (for example, such as the display apparatus 100 of FIG. 1), in accordance with an embodiment of the present disclosure. As shown, the display apparatus 300 comprises at least one image renderer, depicted as an image renderer 302 for rendering an image, an exit optical element 304 through which a projection of the rendered image exits the display apparatus 300 to be incident upon a user's eye 306, when the display apparatus 300 is head-mounted by the user. The display apparatus 300 further comprises means for providing visual cues 308, the visual cues being provided in a peripheral region, the peripheral region substantially surrounding a viewport of the exit optical element 304, whilst lying within a field of view of the user. The display apparatus 300 further comprises a processor (such as the processor 106 of FIG. 1) coupled to the at least one image renderer 302 and the means for providing the visual cues 308. The processor is configured to generate a drive signal based at least partially upon a region of the rendered image that is not visible in the viewport of the exit optical element 304, and to control, via the drive signal, the means for providing the visual cues 308.

Optionally, as shown in FIG. 3, the means for providing the visual cues 308 comprises a plurality of light emitting elements, depicted as light emitting elements 308a, 308b, 308c, 308d, 308e, and 308f, that are arranged in the peripheral region and wherein the processor is configured to control a color and/or intensity of light emitted by the plurality of light emitting elements 308a-f. More optionally, a distance between the plurality of light emitting elements 308a-308f and the user's eye 306 is substantially similar to a distance between the exit optical element 304 and the user's eye 306, when the display apparatus 300 is head-mounted by the user. Furthermore, optionally, the plurality of light emitting elements 308a-308f comprise at least a first set of light emitting elements and a second set of light emitting elements wherein a color and/or intensity of light emitted by the first set of light emitting elements is different from a color and/or intensity of light emitted by the second set of light emitting elements. For example, the first set of light emitting elements may comprise light emitting elements 308a, 308b, and 308c, whereas the second set of light emitting elements may comprise light emitting elements 308d, 308e, and 308f. Additionally, optionally, the means for providing the visual cues 308 further comprises a plurality of diffusers (not shown) for diffusing the light emitted by the plurality of light emitting elements 308a-308f.

Referring to FIG. 4, illustrated is an exemplary implementation of a display apparatus 400 (for example, such as the display apparatus 100 of FIG. 1), in accordance with another embodiment of the present disclosure. The display apparatus 400 comprises at least one image renderer, depicted as image renderer 402 for rendering an image, an exit optical element 404 through which a projection of the rendered image exits the display apparatus 400 to be incident upon a user's eye 406, when the display apparatus 400 is head-mounted by the user. The display apparatus 400 further comprises means for providing visual cues 408, the visual cues being provided in a peripheral region, the peripheral region substantially surrounding a viewport of the exit optical element 404, whilst lying within a field of view of the user. The display apparatus further comprises a processor (such as the processor 106 of FIG. 1) coupled to the at least one image renderer 402 and the means for providing the visual cues 408. The processor is configured to generate a drive signal based at least partially upon a region of the rendered image that is not visible in the viewport of the exit optical element 404, and to control, via the drive signal, the means for providing the visual cues 408.

Optionally, the means for providing the visual cues comprises at least one optical element 410, depicted as optical elements 410, for guiding light emitted from at least a portion of a rendering border of the at least one image renderer 402 towards a portion 412 of the peripheral region, thereby illuminating the peripheral region. More optionally, the at least one optical element 410 is implemented by way of at least one of: a lens, a fiber optic element.

Figure 5:
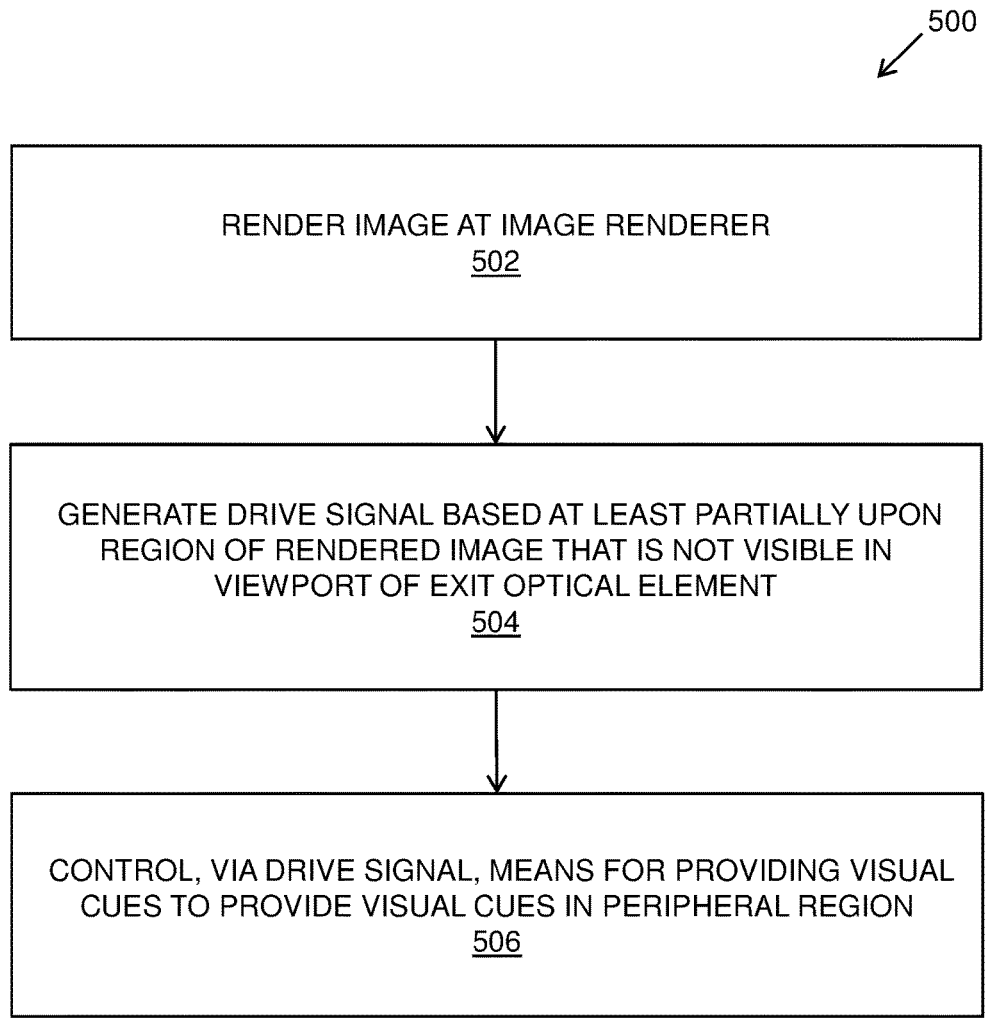
FIG. 5 illustrates steps of a method of displaying via a display apparatus, in accordance with an embodiment of the present disclosure.

Referring to FIG. 5, illustrated are steps of a method 500 of displaying via the display apparatus (for example, such as the display apparatus 100 of FIG. 1), in accordance with an embodiment of the present disclosure. At step 502, an image is rendered at the at least one image renderer, wherein a projection of the rendered image exits the display apparatus through the exit optical element to be incident upon a user's eye, when the display apparatus is head-mounted by the user. At step 504, a drive signal is generated based at least partially upon a region of the rendered image that is not visible in a viewport of the exit optical element. At step 506, the means for providing the visual cues is controlled, via the drive signal, to provide the visual cues in a peripheral region. The peripheral region substantially surrounds the viewport of the exit optical element, whilst lying within a field of view of the user.

The steps 502 to 506 are only illustrative and other alternatives can also be provided where one or more steps are added, one or more steps are removed, or one or more steps are provided in a different sequence without departing from the scope of the claims herein. For example, the method 500 further comprises generating the drive signal based upon at least one subsequent image that is to be rendered at the at least one image renderer after the rendered image. Optionally, in the method 500, the means for providing the visual cues comprises a plurality of light emitting elements that are arranged in the peripheral region and wherein the method further comprises controlling a color and/or intensity of light emitted by the plurality of light emitting elements. More optionally, in the method 500, the means for providing the visual cues further comprises a plurality of diffusers for diffusing the light emitted by the plurality of light emitting elements. Furthermore, optionally, in the method 500, the plurality of light emitting elements comprise at least a first set of light emitting elements and a second set of light emitting elements, wherein the step of controlling the color and/or intensity of light comprises controlling the first set of light emitting elements and the second set of light emitting elements in a manner that a color and/or intensity of light emitted by the first set of light emitting elements is different from a color and/or intensity of light emitted by the second set of light emitting elements. Optionally, in the method 500, the means for providing the visual cues comprises at least one optical element for guiding light emitted from at least a portion of a rendering border of the at least one image renderer towards the peripheral region, thereby illuminating the peripheral region. More optionally, in the method 500, the at least one optical element is implemented by way of at least one of: a lens, a fiber optic element.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
   at least one image renderer for rendering an image;
   an exit optical element through which a projection of the rendered image exits the display apparatus to be incident upon a user's eye, when the display apparatus is head-mounted by the user;
   means for providing visual cues, the visual cues being provided in a peripheral region, the peripheral region substantially surrounding a viewport of the exit optical element, whilst lying within a field of view of the user; and
   a processor coupled to the at least one image renderer and the means for providing the visual cues, wherein the processor is configured to generate a drive signal based at least partially upon a region of the rendered image that is not visible in the viewport of the exit optical element, and to control, via the drive signal, the means for providing the visual cues.

2. The display apparatus of claim 1, wherein the processor is configured to generate the drive signal based upon at least one subsequent image that is to be rendered at the at least one image renderer after the rendered image.

3. The display apparatus of claim 1, wherein the means for providing the visual cues comprises a plurality of light emitting elements that are arranged in the peripheral region, and wherein the processor is configured to control a color and/or intensity of light emitted by the plurality of light emitting elements.

4. The display apparatus of claim 3, wherein a distance between the plurality of light emitting elements and the user's eye is substantially similar to a distance between the exit optical element and the user's eye, when the display apparatus is head-mounted by the user.

5. The display apparatus of claim 3, wherein the means for providing the visual cues further comprises a plurality of diffusers for diffusing the light emitted by the plurality of light emitting elements.

6. The display apparatus of claim 3, wherein the plurality of light emitting elements comprise at least a first set of light emitting elements and a second set of light emitting elements, wherein a color and/or intensity of light emitted by the first set of light emitting elements is different from a color and/or intensity of light emitted by the second set of light emitting elements.

7. The display apparatus of claim 1, wherein the means for providing the visual cues comprises at least one optical element for guiding light emitted from at least a portion of a rendering border of the at least one image renderer towards the peripheral region, thereby illuminating the peripheral region.

8. The display apparatus of claim 7, wherein the at least one optical element is implemented by way of at least one of: a lens, a fiber optic element.

9. A method of displaying, via a display apparatus comprising at least one image renderer, an exit optical element and means for providing visual cues, the method comprising:
   rendering an image at the at least one image renderer, wherein a projection of the rendered image exits the display apparatus through the exit optical element to be incident upon a user's eye, when the display apparatus is head-mounted by the user;
   generating a drive signal based at least partially upon a region of the rendered image that is not visible in a viewport of the exit optical element; and
   controlling, via the drive signal, the means for providing the visual cues to provide the visual cues in a peripheral region, the peripheral region substantially surrounding the viewport of the exit optical element, whilst lying within a field of view of the user.

10. The method of claim 9, wherein the step of generating the drive signal is performed based upon at least one subsequent image that is to be rendered at the at least one image renderer after the rendered image.

11. The method of claim 9, wherein the means for providing the visual cues comprises a plurality of light emitting elements that are arranged in the peripheral region, and wherein the method further comprises controlling a color and/or intensity of light emitted by the plurality of light emitting elements.

12. The method of claim 11, wherein the means for providing the visual cues further comprises a plurality of diffusers for diffusing the light emitted by the plurality of light emitting elements.

13. The method of claim 11, wherein the plurality of light emitting elements comprise at least a first set of light emitting elements and a second set of light emitting elements, wherein the step of controlling the color and/or intensity of light comprises controlling the first set of light emitting elements and the second set of light emitting elements in a manner that a color and/or intensity of light emitted by the first set of light emitting elements is different from a color and/or intensity of light emitted by the second set of light emitting elements.

14. The method of claim 9, wherein the means for providing the visual cues comprises at least one optical element for guiding light emitted from at least a portion of a rendering border of the at least one image renderer towards the peripheral region, thereby illuminating the peripheral region.

15. The method of claim 14, wherein the at least one optical element is implemented by way of at least one of: a lens, a fiber optic element.

* * * * *